(12) United States Patent
Haddy (10) Patent No.: US 8,358,201 B1
(45) Date of Patent: Jan. 22, 2013

(54) STORAGE AND RECALL OF BURIED ASSET DATA OVER COMMUNICATIONS NETWORKS FOR DAMAGE AVOIDANCE AND MAPPING

(76) Inventor: Alan Haddy, Naples, FL (US)

(*) Notice: Subject to any disclaimer, the term of this patent is extended or adjusted under 35 U.S.C. 154(b) by 0 days.

(21) Appl. No.: 13/543,612

(22) Filed: Jul. 6, 2012

(51) Int. Cl.
*G08B 5/22* (2006.01)
(52) U.S. Cl. .......................................... 340/8.1
(58) Field of Classification Search ............... 707/104.1; 702/150; 340/8.1
See application file for complete search history.

(56) References Cited

U.S. PATENT DOCUMENTS

| | | | |
|---|---|---|---|
| 6,094,625 A * | 7/2000 | Ralston | 702/150 |
| 6,815,411 B2 | 11/2004 | Trinh | |
| 6,975,942 B2 * | 12/2005 | Young et al. | 702/5 |
| 7,319,387 B2 * | 1/2008 | Willson et al. | 340/539.13 |
| 7,482,973 B2 | 1/2009 | Tucker | |
| 7,978,125 B2 * | 7/2011 | Battisti | 342/160 |
| 7,978,129 B2 | 7/2011 | Sawyer | |
| 8,155,390 B2 * | 4/2012 | Nielsen et al. | 382/109 |
| 2002/0184235 A1 * | 12/2002 | Young et al. | 707/104.1 |
| 2009/0204614 A1 | 8/2009 | Nielsen et al. | |
| 2009/0204625 A1 | 8/2009 | Chambers et al. | |
| 2012/0105440 A1 | 5/2012 | Lieberman et al. | |

OTHER PUBLICATIONS

Cote, Augmented reality for underground infrastructure: the problem of spatial perception, downloaded from communities.bentley.com on Jul. 6, 2012.
CertusView Welcome Page, downloaded from www.certusview.com on Jul. 6, 2012.
Talmaki, et al., Geospatial databases and augmented reality visualization for improving safety in urban excavation operations, Dept. of Civil and Environmental Engineering, An Arbor, MI.
Schall, Handheld Augmented Reality in Civil Engineering, Institute for Computer Graphics and Vision, Graz University of Technology, Austria.

* cited by examiner

*Primary Examiner* — Hai Phan
*Assistant Examiner* — Kaleria Knox
(74) *Attorney, Agent, or Firm* — Mark Terry (57) ABSTRACT

A method for facilitating collection and recall of buried asset data on a mobile device on a network is provided. The mobile device transmits current position data of the mobile device to a server via the network, and receives from the server, a) buried asset data including depth data and electrical signal data for one or more buried assets, wherein the buried asset data corresponds to the current position data, and b) a stored image of a physical area corresponding to the current position data, wherein the stored image comprises markings indicating a position of the buried assets. The mobile device further displays the buried asset data from the server, and reads a current image of the physical area of the mobile device. The mobile computing device further displays the stored image overlaid onto the current image, and determines that the stored image is aligned with the current image.

17 Claims, 7 Drawing Sheets

STORAGE AND RECALL OF BURIED ASSET DATA OVER COMMUNICATIONS NETWORKS FOR DAMAGE AVOIDANCE AND MAPPING

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The technical field relates generally to the identification of buried assets (i.e., underground utility lines) and, more specifically, to processes for utilizing buried asset data over telecommunications networks.

BACKGROUND

Utility lines, such as lines for telephones, electricity distribution, natural gas, cable television, fiber optics, Internet, traffic lights, street lights, storm drains, water mains, and wastewater pipes, are often located underground. Utility lines are referred to as "buried assets" herein. Consequently, before excavation occurs in an area, especially an urban area, an excavator is typically required to clear excavation activities with the proper authorities. The clearance procedure usually includes contacting a central authority that in turn notifies the appropriate utility companies. Subsequently, each utility company must perform a buried asset detection procedure, which includes visiting the excavation site, detecting the relevant buried assets and physically marking the position of the buried asset using temporary paint or flags. Upon completion of this procedure by the appropriate utility companies, excavation can occur with the security that buried assets will not be damaged.

One of the problems that arise during buried asset detection is the amount of time spent detecting the buried asset. Usually, a technician visiting a proposed excavation site is not provided with any position data, or only vague position data as a starting point. Consequently, the technician must perform time consuming sensing procedures on a large swath of land to detect the buried asset. This increases the time and resources necessary to detect the buried asset. Another problem with conventional buried asset detection is the method by which buried asset data is conveyed. Typically, a technician marks the positions of buried assets using temporary paint and/or flags at the proposed excavation site. These surface markings, however, were designed to remain only for a short period of time. Consequently, after the surface markings have been erased or removed, buried asset detection must be performed again, if the need arises in the future. This is wasteful and redundant.

Therefore, a need exists for improvements over the prior art, and more particularly for methods and systems that expedite the buried asset detection process for excavation sites, while reducing waste and redundancy.

SUMMARY

A method and system that facilitates collection and recall of buried asset data on a mobile computing device communicatively coupled with a communications network is provided. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a method for facilitating collection and recall of buried asset data on a mobile computing device communicatively coupled with a communications network is provided that solves the above-described problems. The mobile computing device transmits current position data of the mobile computing device to a server via the communications network, and receives, from the server via the communications network, a) buried asset data including depth data and electrical signal data for one or more buried assets, wherein the buried asset data corresponds to the current position data, and b) a stored image of a physical area corresponding to the current position data, wherein the stored image comprises one or more markings indicating a position of the one or more buried assets. The mobile computing device further displays the buried asset data from the server, and reads a current image of the physical area from an optical sensor of the mobile computing device. The mobile computing device further displays the stored image overlaid onto the current image, and determines that the stored image is aligned within a margin of error with the current image.

BRIEF DESCRIPTION OF THE DRAWINGS

The accompanying drawings, which are incorporated in and constitute a part of this disclosure, illustrate various example embodiments. In the drawings.

DETAILED DESCRIPTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

The present invention improves over the prior art by providing systems and methods that allow for the re-use of prior buried asset detection activities. The present invention allows technicians performing standard buried asset detection procedures on a proposed excavation site to view prior buried asset data about the same site on a mobile computing device. This data guides the technician to the position of buried assets, thereby reducing the amount of time and resources spent detecting the buried assets. The present invention further utilizes an image comparison method whereby a current image of the proposed excavation site is compared with a stored image of the proposed excavation site, wherein the stored image including markings and objects that indicate the position of buried assets. This image comparison method further aids the technician in performing buried asset detection procedures, which further reduces time spent detecting the buried asset. Lastly, the present invention allows the technician to upload the current buried asset data he has garnered at the proposed excavation site, which may be used in future buried asset detection activities at the same site.

Figure 1:
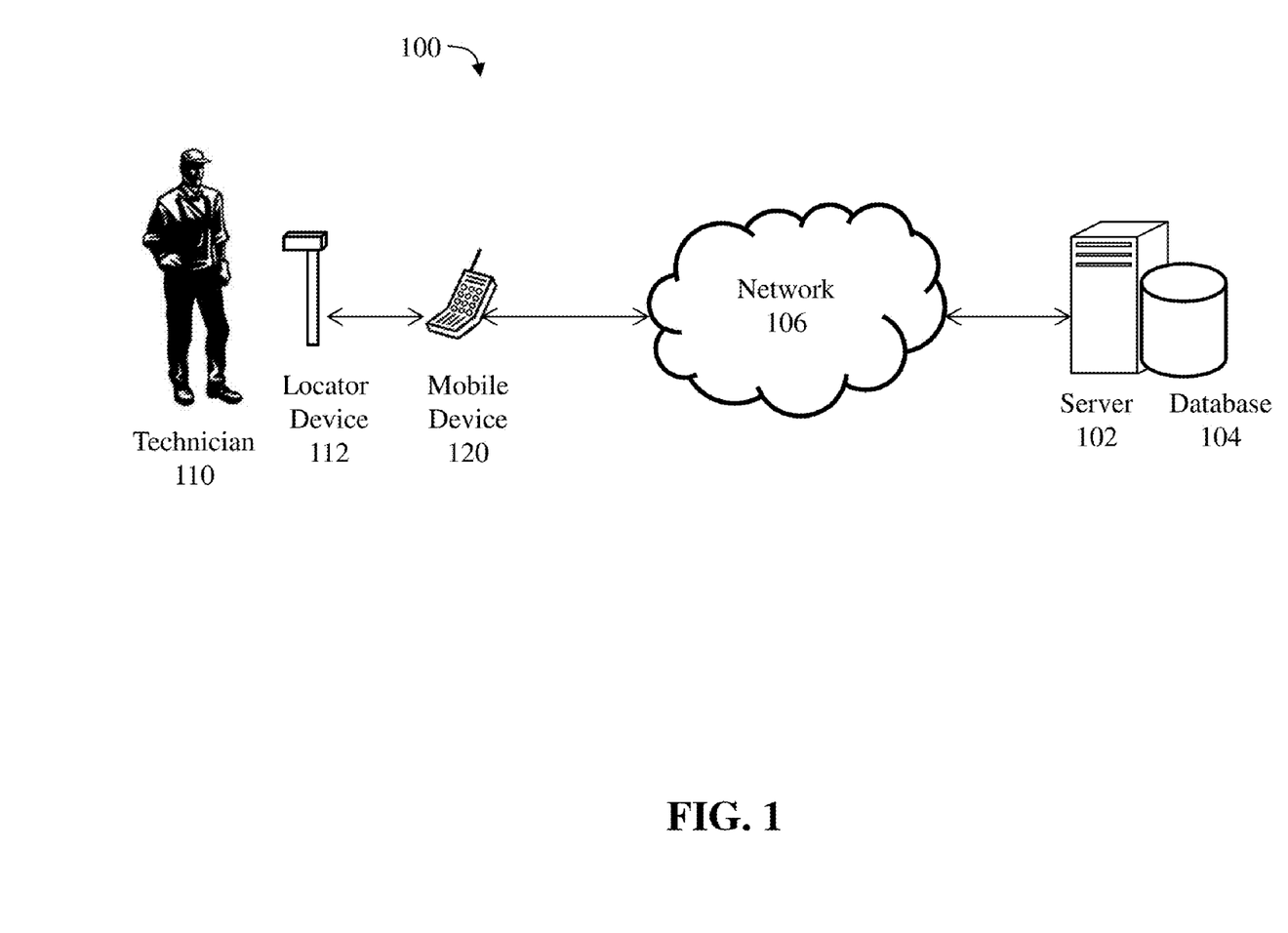
FIG. 1 is a block diagram of an operating environment that supports a process for facilitating collection and recall of buried asset data on a server communicatively coupled with a communications network, according to an example embodiment.

FIG. 1 is a block diagram of an operating environment 100 that supports a process for facilitating collection and recall of buried asset data on a server communicatively coupled with a communications network, according to an example embodiment. The environment 100 may comprise at least one mobile computing device 120 and a server 102 communicating via a communications network 106. The at least one mobile computing device 120 may be connected either wirelessly or in a wired or fiber optic form to the communications network 106. The environment 100 may further comprise at least one locator device 112 (operated by a technician 110) communicatively coupled, either wirelessly or in a wired or fiber optic form to the mobile computing device 120. Communications network 106 may be a packet switched network, such as the Internet, or any local area network, wide area network, enterprise private network, cellular network, phone network, mobile communications network, or any combination of the above.

A locator device 112 may be a conventional, off-the-shelf, utility locator that detects and identifies buried assets using radio frequency and/or magnetic sensors. As such, locator device 112 and mobile computing device 120 may each comprise a computing device 600, described below in greater detail with respect to FIG. 6. Further, mobile computing device 120 and locator device 112 may each comprise mobile computing devices such as cellular telephones, smart phones or tablet computers, or other computing devices such as a desktop computer, laptop, game console, for example. In one embodiment, the locator device 112 may be a conventional, off-the-shelf utility locator that has been integrated with mobile computing device 120. In another embodiment, the locator device 112 may be a conventional, off-the-shelf utility locator that is communicatively coupled, either in a wired format or wirelessly (such as via the Bluetooth protocol) with mobile computing device 120.

Server 102 includes a software engine that delivers applications, data, program code and other information to networked devices 120. The software engine of server 102 may perform other processes such as transferring multimedia data in a stream of packets that are interpreted and rendered by a software application as the packets arrive. It should be noted that although FIG. 1 shows only one locator device 112 and one mobile computing device 120, the system of the present invention supports any number of locator devices and mobile computing devices connected via network 106.

Server 102, mobile computing device 120 and locator device 112 may each include program logic comprising computer source code, scripting language code or interpreted language code that perform various functions of the present invention. In one embodiment, the aforementioned program logic may comprise program module 607 in FIG. 6.

FIG. 1 further shows that server 102 includes a database or repository 104, which may be a relational database comprising a Structured Query Language (SQL) database stored in a SQL server. Mobile computing device 120 and locator device 112 may also each include databases. The database 104 may serve data used by server 102, mobile computing device 120 and locator device 112 during the course of operation of the invention.

Environment 100 may be used when a mobile computing device 120 and locator device 112 engage in buried asset detection activities that comprise storing and reading buried asset data to and from database 104 coupled to server 102. Various types of data may be stored in the database 104 of server 102. For example, the database 104 may store one or more records for each location, i.e., a location record. A location record may include location data, such as latitude and longitude coordinates, an altitude coordinate, a current time, a textual map address, or the like. A location record may also include a list of buried asset data, wherein each buried asset item may be defined by its depth, position, electrical signal measurement (such as current, resistance, impedance, magnitude, frequency, etc.) and orientation.

A location record may further include one or more images (i.e., photographs) of the physical area of the location. In one embodiment, an image of a physical area corresponding to a location comprises one or more surface markings indicating a position of the one or more buried assets. Markings may include colored or uncolored solid lines, dotted lines, circles, squares, flags, arrows, objects, text or other visual indicia in the image that indicate the actual location of a buried asset. A solid yellow line, for example, may be used in an image of a physical area corresponding to a location in order to indicate the presence of a buried asset in the actual location of the solid yellow line. Lastly, a location record may include other data, such as the name or unique identifier for the technician that created the location record, a time/date stamp indicating a creation and/or modification date of the location record, etc.

Note that although server 102 is shown as a single and independent entity, in one embodiment of the present invention, the functions of server 102 may be integrated with another entity, such as the mobile computing device 120 and the locator device 112. Further, server 102 and its functionality, according to a preferred embodiment of the present invention, can be realized in a centralized fashion in one computer system or in a distributed fashion wherein different elements are spread across several interconnected computer systems.

Figure 2:
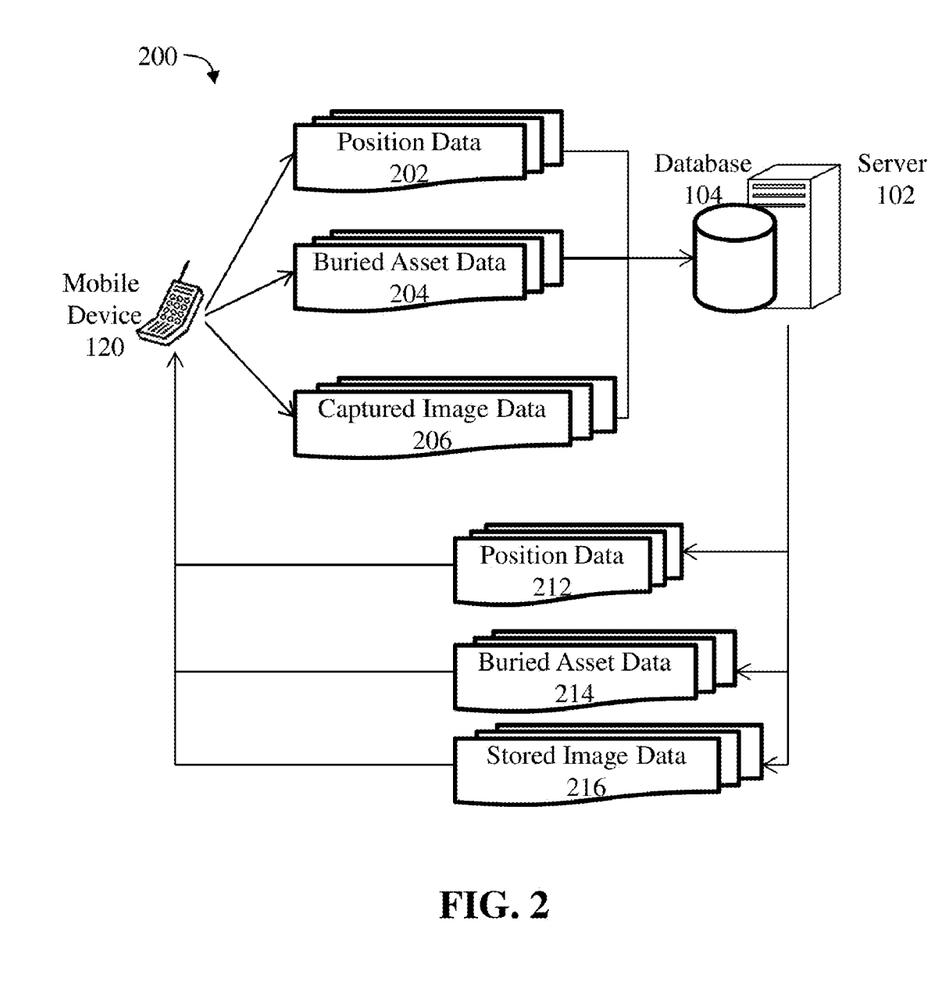
FIG. 2 is a diagram showing the data flow of the process for facilitating collection and recall of buried asset data, according to an example embodiment.
Figure 3:
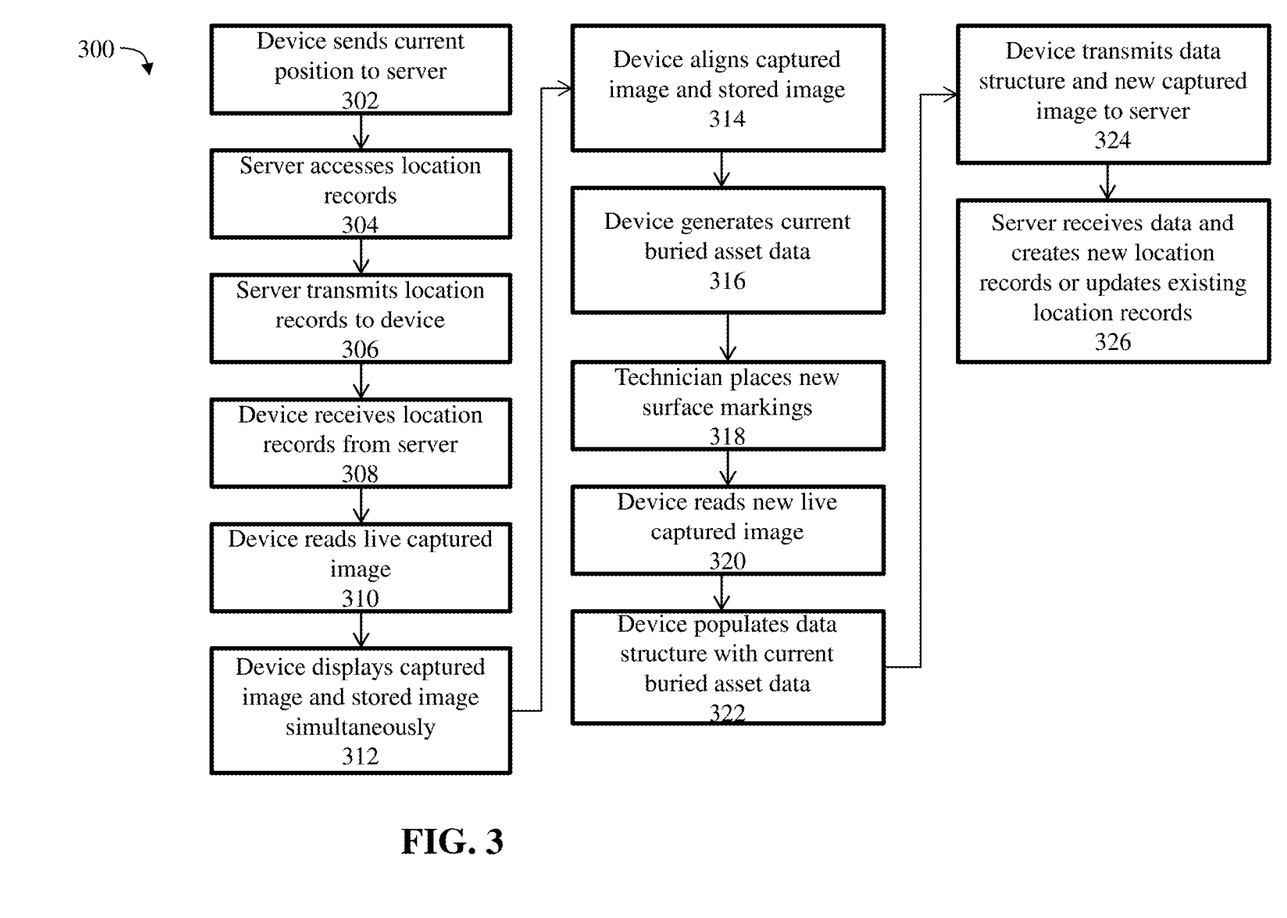
FIG. 3 is a flow chart of a method for facilitating collection and recall of buried asset data on a server communicatively coupled with a communications network, according to an example embodiment.

FIG. 3 is a flow chart of a method 300 for facilitating collection and recall of buried asset data on the server 102 communicatively coupled with the communications network 106, according to an example embodiment. Method 300 describes the steps that occur when a technician 110 visits a proposed excavation site and utilizes a mobile computing device 120 and locator device 112 to perform standard buried asset detection procedures. The method 300 is described with reference to FIG. 2, which is a diagram 200 showing the data flow of the process for facilitating collection and recall of buried asset data.

Method 300 starts with step 302 wherein the device 120 calculates its current position (e.g., current position data 202) and transmits it to the server 102. In one embodiment, the device 120 calculates its current position using a Global Positioning System (GPS) receiver, which is a navigation device that receives GPS signals for the purpose of determining the device's current position on Earth. A GPS receiver, and its accompanying processor, may calculate latitude, longitude and altitude information. In this embodiment, step 302 comprises receiving a radio frequency signal from a GPS transmitter (such as a satellite) comprising a time the signal was transmitted and a position of the transmitter, calculating current position data 202 of the device 120 based on the signal, and transmitting the current position data 202 to the server 102 via the communications network 106. In another embodiment, the device 120 calculates its current position using alternative services, such as control plan locating, GSM localization, dead reckoning, or any combination of the aforementioned position services. In yet another embodiment, the device 120 also calculates its current compass heading (such as via the use of a compass application) and transmits this data to the server 102.

Next, in step 304 the server 102 receives the current position data 202 (and any other data transmitted by device 120) and accesses any location records in its database 104 that correspond to the current position data 202 or within a margin of error of the current position data 202. If any such location records are found, in step 306 the server 102 transmits the one or more location records to the device 120 over the network 106. As explained above, each location record may include position data 212, buried data 214 and stored image data 216.

Figure 4:
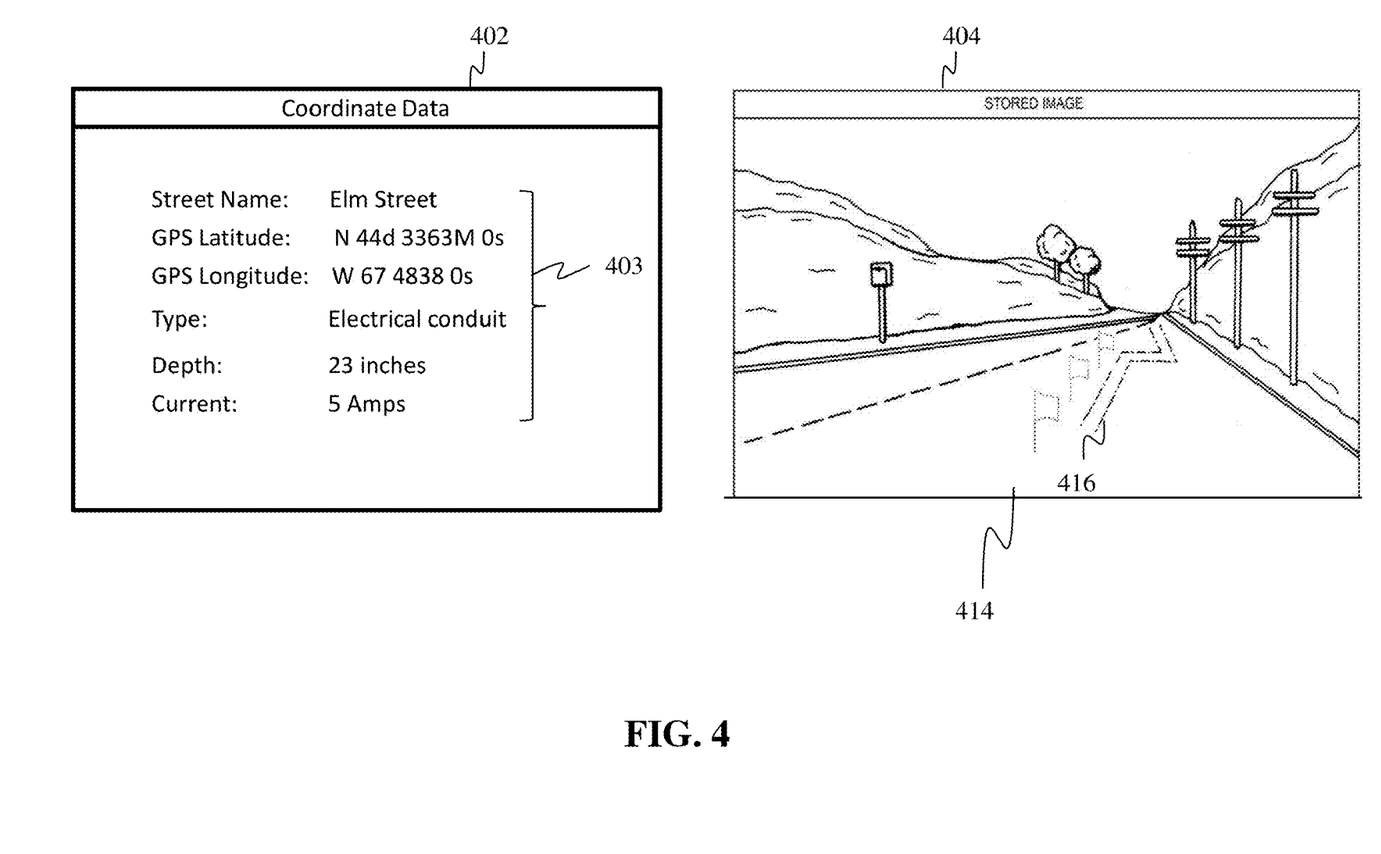
FIG. 4 is an illustration of two graphical user interfaces that display data that has been collected for buried asset data, according to an example embodiment.

In step 308, the device 120 receives the location records. If device 120 receives only one location record, then the data in the location record is displayed for the technician 110 on a display of device 120 via, for example, one or more graphical user interfaces. FIG. 4, for example, is an illustration of two graphical user interfaces that display location record information. Interface 402 displays position data 212 and buried asset data 214 via text 403, while interface 404 displays stored image data 216 as stored image 414. Note that the stored image 414 displayed in interface 404 comprises a marking 416 that indicates the position of a buried asset. Specifically, stored image 414 includes a dashed line 416, which indicates the position of a buried asset in the physical area represented by the stored image 414. Note that stored image 414 comprises an image or photograph taken by a technician executing buried asset detection procedures at a previous time.

In one alternative to step 308, if device 120 receives multiple location records, then an abbreviated or truncated version of each location record is displayed for the technician 110 on a display of device 120 via, for example, one or more graphical user interfaces, so as to allow the technician to select one location record. For example, device 120 may display a list of stored images for each of the multiple location records, thereby allowing the technician to select one of the location records by clicking on one of the stored images. In another example, device 120 may display a drop down menu that displays a list of time/date stamps for each of the multiple location records, thereby allowing the technician to select one of the location records by clicking on one of the drop down menu items.

Figure 5A:
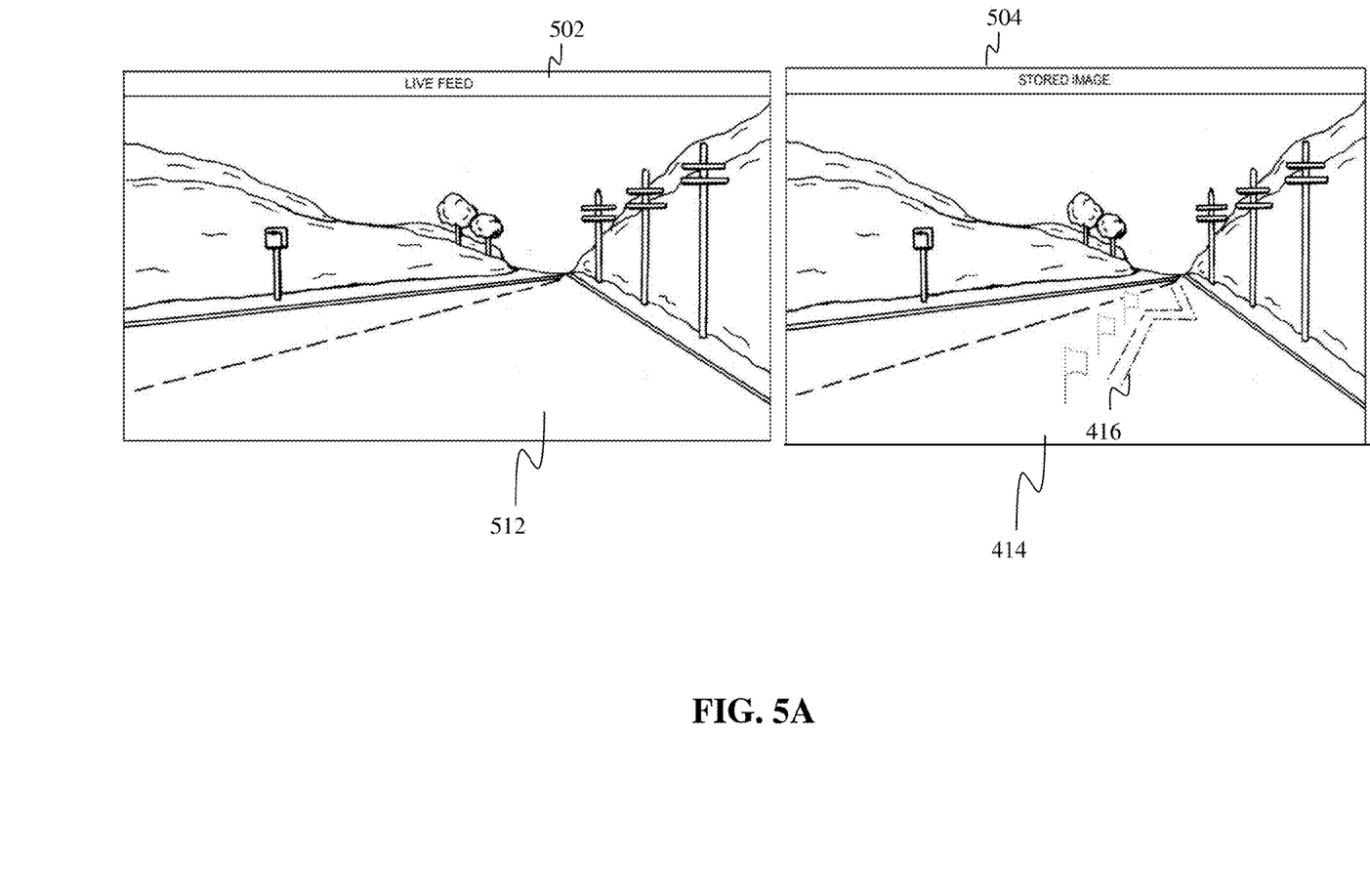
FIG. 5A is an illustration of two graphical user interfaces that display images that facilitate the collection and recall of buried asset data, according to an example embodiment.

Next, in step 310 the device 112 reads a live, current or captured image of the physical area of the device 120 from an optical sensor of the device 120, such as a camera. In step 312, the device 120 displays the captured image simultaneously with the stored image 414, described above. Step 312 may be executed in a variety of ways. In one embodiment of step 312, FIG. 5A is an illustration of two graphical user interfaces 502, 504 that display the stored image 414 in conjunction with the captured image. Interface 502 displays the captured image 512 while interface 504 displays the stored image 414, including the markings 416, which indicate the position of one or more buried assets. FIG. 5A shows that captured image 512 appears to show a physical area slightly to the left of the physical area shown by stored image 414. FIG. 5A shows that if the optical sensor or camera of device 120 were to pan slightly to the right, then the stored image 414 would correspond identically, or nearly identically, to the captured image 512—i.e., the stored image 414 would be wholly aligned with captured image 512.

In one alternative, the device 120 may place arrows on the captured image 512 indicating to the technician how the optical sensor or camera of device 120 should be panned so that stored image 414 would be aligned with captured image 512. Using FIG. 5A as a example, the device 120 may render a graphic on the captured image 512 depicting an arrow pointing to the right, thereby indicating to the technician that device 120 should be panned slightly to the right so that stored image 414 would be aligned with captured image 512.

Figure 5B:
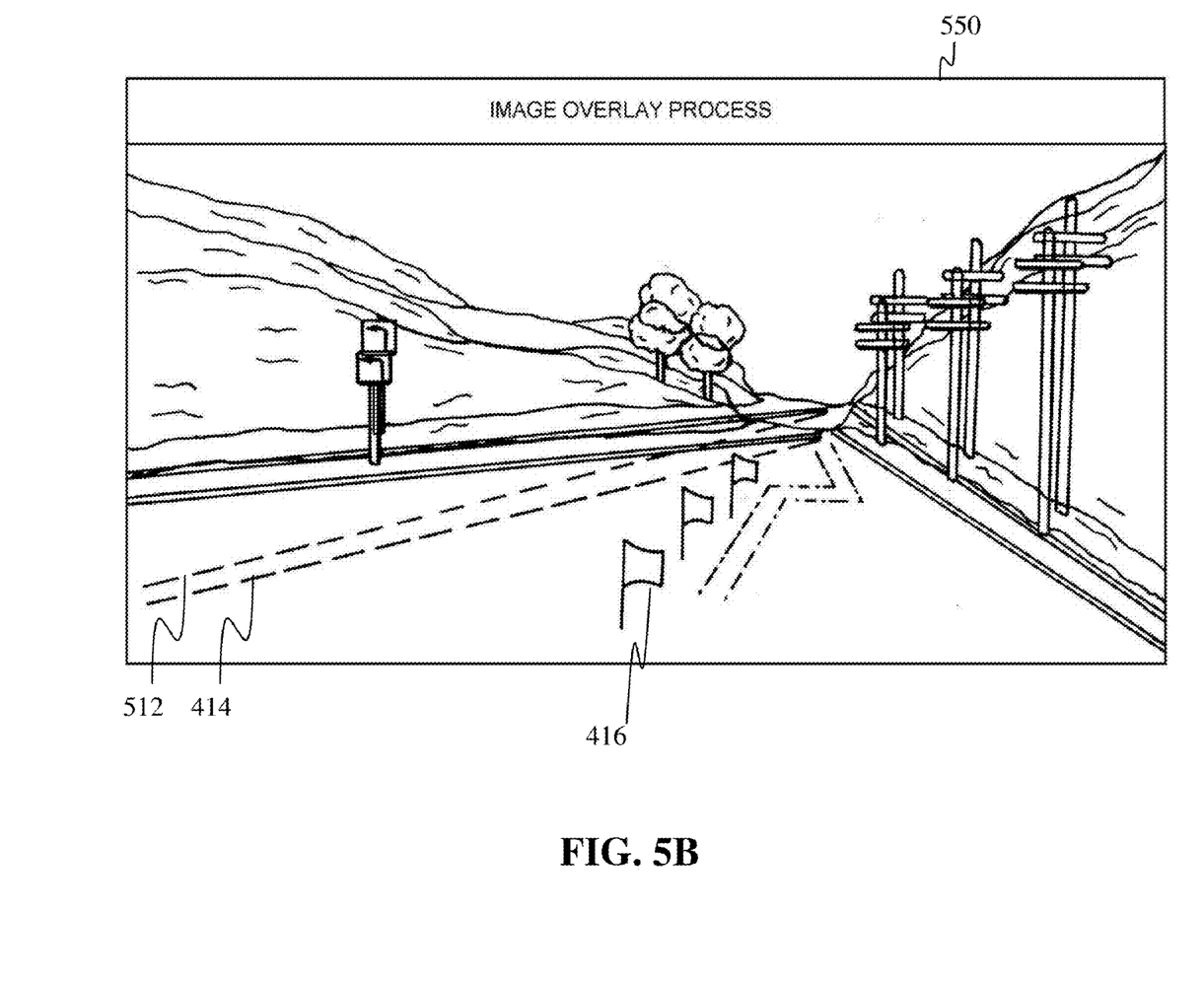
FIG. 5B is an illustration of a graphical user interface that displays images that facilitate the collection and recall of buried asset data, according to an example embodiment.

In another embodiment of step 312, FIG. 5B is an illustration of a graphical user interface 550 that displays the stored image 414 overlaid onto the captured image 512. Interface 550 may first render the captured image 512 onto interface 550 and secondly render the stored image 414, including the markings 416, onto interface 550. FIG. 5A shows that captured image 512 appears to show a physical area slightly lower and to the right of the physical area shown by stored image 414. FIG. 5A shows that if the optical sensor or camera of device 120 were to pan slightly higher and to the left, then the stored image 414 would correspond identically, or nearly identically, to the captured image 512—i.e., the stored image 414 would be wholly aligned with captured image 512. As described above, the device 120 may place arrows on the captured image 512 indicating to the technician how the optical sensor or camera of device 120 should be panned so that stored image 414 would be aligned with captured image 512.

Returning to the method of 300, in step 314, the device 112 determines that the stored image 414 has been aligned, within a margin of error, with the captured image 512. The purpose of step 314 is to aid the technician 110 in finding the position of buried assets at his current location. When the stored image 414 has been aligned with the captured image 512, the technician 110 is on notice that his device is looking, i.e., pointing at, the exact same place as shown in the stored image 414. Thus, step 314 ensures: a) that the position of the device 120 is the same, or nearly the same as, the position of the location record received by device 120 and b) that the physical area shown in captured image 512 is the same, or nearly the same as, the physical area shown in stored image 414. Step 314 may be executed in a variety of ways.

In one embodiment of step 314, the technician 110 pans the optical sensor or camera of device 120 so that the stored image 414 becomes aligned, within a margin of error, to the captured image 512. Subsequently, the technician 110 enters a command or presses a graphical user interface widget to indicate to device 120 that the stored image 414 has been aligned with the captured image 512. In another embodiment of step 314, the technician 110 pans the optical sensor or camera of device 120 until the device 120, using known image processing techniques (such as object recognition or pattern recognition), determines that the stored image 414 has been aligned, within a margin of error, to the captured image 512. In this embodiment, the device 120 may use known image processing techniques to indicate to the technician 110 in which direction to pan the camera. Subsequently, the device 120 stores an indicator and/or displays a message to technician 110 indicating that the stored image 414 has been aligned with the captured image 512.

Next, in step 316, the device 112 generates current buried asset data 204 based on data received from one or more sensors of the device 112, and transmits the buried asset data to the device 120. In one embodiment, the device 120 compares the current buried asset data 204 with the buried asset data 214 received from the server 102. In this embodiment, the control flow proceeds to steps 318 through 324 only if the current buried asset data 204 is identical to, or nearly identical to (i.e., substantially equal or within a margin of error) the buried asset data 214.

In step 318, the technician 110 may utilize the data it received from server 102 (such as 212, 214, 216), as well as the current data generated by devices 112 and 120 (such as 202, 204, 206), to place temporary physical markings at his current location, typically using paint and/or flags, to indicate the location of any buried assets. In step 320, the technician uses the device 120 to capture a new image or photograph of the current location, wherein the image includes the surface markings that have been placed by the technician. The new captured image is referred to as captured image data 206.

In step 322, the device 120 generates a data structure and auto-populates the data structure with the current buried asset data 204. A data structure may be an array, a record, a hash, a union, a set, an object or the like. In step 324, the device 120 transmits the data structure including the current buried asset data 204, and the capture image data 206, to the server 102 via the communications network 106. In one embodiment, the data transmitted to server 102 in step 324 may include other data, such as the name or unique identifier for the technician that created the data, a time/date stamp indicating a creation and/or modification date of the buried asset data 204 and/or captured image data 206, etc.

In step 326, the server 102 receives the data 204, 206 and in response, generates and stores, in database 104, one or more location records, in which is stored the current buried asset data 204, the captured image data 206, and the position data 202 previously provided by device 120 in step 302. In one alternative, step 326, the server 102 receives the data 204, 206 and in response, updates the one or more location records (in database 104) previously accessed by server 102 in step 304.

Note that the location records generated and stored in step 326 are stored in association with the one or more location records accessed by server 102 in step 304, since the location records generated and stored in step 320 correspond to the same position data 202 as the location records accessed by server 102 in step 304. Subsequently, when the server 102 seeks location records associated with position data 202 in the future, server 102 will access the same location records generated and stored in step 320.

In an alternative embodiment, the database 104 and the functionality of server 102 are both integrated into the device 120. In this alternative embodiment, the method 300 is executed as defined below.

In step 302, the device 120 calculates its current position and in step 304 the device 120 accesses any location records in its database that correspond to the current position data 202 or within a margin of error of the current position data 202. In this embodiment, step 306 is not executed. In step 308, the device 120 displays the data in the location record for the technician 110, such as in interfaces 402 and 404.

Next, in step 310 the device 112 reads a current or captured image of the physical area of the device 120 from an optical sensor of the device 120, such as a camera. In step 312, the device 120 displays the captured image simultaneously with the stored image 414, as described above. In step 314, the device 112 determines that the stored image 414 has been aligned, within a margin of error, with the captured image 512. In step 316, the device 112 generates current buried asset data 204 based on data received from one or more sensors of the device 112, and transmits the buried asset data to the device 120. In step 318, the technician 110 may utilize the data that was accessed in step 304 above, as well as the current data generated by devices 112 and 120 (such as 202, 204, 206), to place temporary physical markings at his current location. In step 320, the technician uses the device 120 to capture a image data 206 of the current location, wherein the image includes the markings that have been placed by the technician.

In step 322, the device 120 generates a data structure and auto-populates the data structure with the current buried asset data 204. In this embodiment, step 324 is not executed. In step 326, the device 120 generates and stores, in its database, one or more location records, in which is stored the current buried asset data 204, the captured image data 206, and the position data 202 previously determined by device 120 in step 302.

Figure 6:
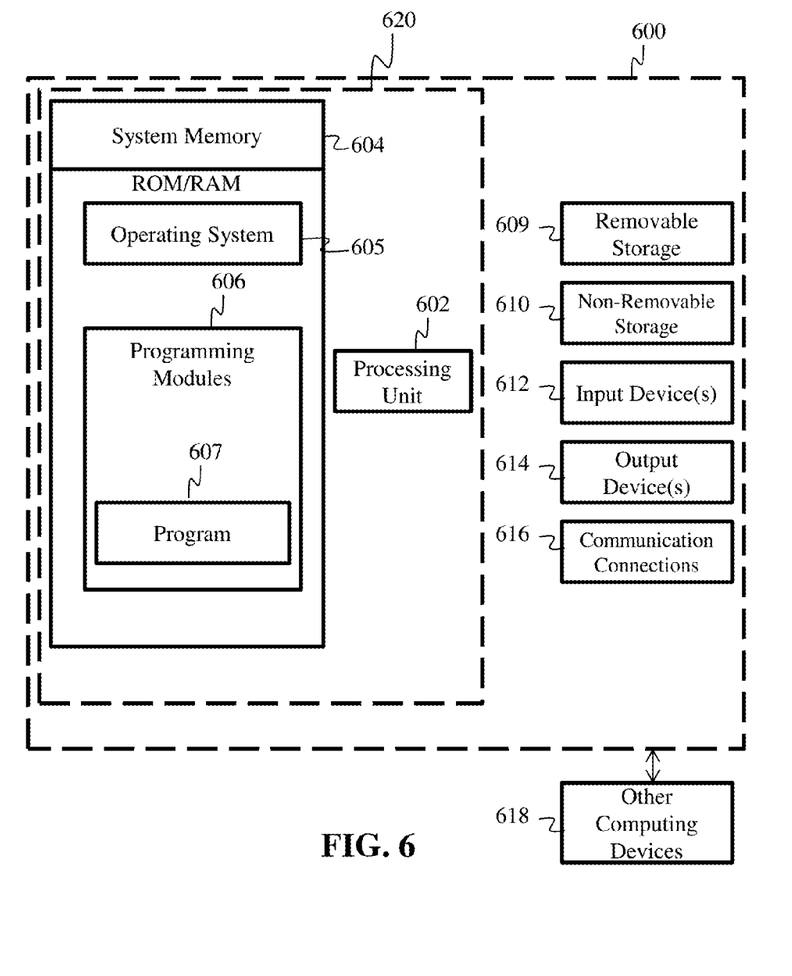
FIG. 6 is a block diagram of a system including a computing device, according to an example embodiment.

FIG. 6 is a block diagram of a system including an example computing device 600 and other computing devices. Consistent with the embodiments described herein, the aforementioned actions performed by server 102, device 112 and device 120 may be implemented in a computing device, such as the computing device 600 of FIG. 6. Any suitable combination of hardware, software, or firmware may be used to implement the computing device 600. The aforementioned system, device, and processors are examples and other systems, devices, and processors may comprise the aforementioned computing device. Furthermore, computing device 600 may comprise an operating environment for method 300 as described above. Method 300 may operate in other environments and is not limited to computing device 600.

With reference to FIG. 6, a system consistent with an embodiment of the invention may include a plurality of computing devices, such as computing device 600. In a basic configuration, computing device 600 may include at least one processing unit 602 and a system memory 604. Depending on the configuration and type of computing device, system memory 604 may comprise, but is not limited to, volatile (e.g. random access memory (RAM)), non-volatile (e.g. read-only memory (ROM)), flash memory, or any combination or memory. System memory 604 may include operating system 605, and one or more programming modules 606. Operating system 605, for example, may be suitable for controlling computing device 600's operation. In one embodiment, programming modules 606 may include, for example, a program module 607 for executing the actions of device 112, device 120 and/or server 102. Furthermore, embodiments of the invention may be practiced in conjunction with a graphics library, other operating systems, or any other application program and is not limited to any particular application or system. This basic configuration is illustrated in FIG. 6 by those components within a dashed line 620.

Computing device 600 may have additional features or functionality. For example, computing device 600 may also include additional data storage devices (removable and/or non-removable) such as, for example, magnetic disks, optical disks, or tape. Such additional storage is illustrated in FIG. 6 by a removable storage 609 and a non-removable storage 610. Computer storage media may include volatile and nonvolatile, removable and non-removable media implemented in any method or technology for storage of information, such as computer readable instructions, data structures, program modules, or other data. System memory 604, removable storage 609, and non-removable storage 610 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 600. Any such computer storage media may be part of device 600. Computing device 600 may also have input device(s) 612 such as a keyboard, a mouse, a pen, a sound input device, a camera, a touch input device, etc. Output device(s) 614 such as a display, speakers, a printer, etc. may also be included. The aforementioned devices are only examples, and other devices may be added or substituted.

Computing device 600 may also contain a communication connection 616 that may allow device 600 to communicate with other computing devices 618, such as over a network in a distributed computing environment, for example, an intranet or the Internet. Communication connection 616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 604, including operating system 605. While executing on processing unit 602, programming modules 606 (e.g. program module 607) may perform processes including, for example, one or more of method 300's stages as described above. The aforementioned processes are examples, and processing unit 602 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for facilitating collection and recall of buried asset data on a mobile computing device communicatively coupled with a communications network, comprising:
   transmitting current position data of the mobile computing device to a server via the communications network;
   receiving, from the server via the communications network, a) buried asset data including depth data and electrical signal data for one or more buried assets, wherein the buried asset data corresponds to the current position data, and b) a stored image of a physical area corresponding to the current position data, wherein the stored image comprises one or more markings indicating a position of the one or more buried assets; displaying the buried asset data from the server;
   reading a current image of the physical area from an optical sensor of the mobile computing device;
   displaying the stored image simultaneously with the current image, wherein the stored image is overlaid onto the current image;

determining that the stored image is aligned within a margin of error to the current image;
receiving current buried asset data from one or more sensors communicatively coupled with the mobile computing device;
reading a second current image of the physical area from the optical sensor of the mobile computing device, wherein the second current image comprises one or more markings indicating a position of the one or more buried assets;
generating a data structure and auto-populating the data structure with the current buried asset data; and
transmitting the data structure and the second current image to the server via the communications network.

2. The method of claim 1, wherein the step of transmitting current position data further comprises:
receiving a radio frequency signal comprising a time the signal was transmitted and a location of a sender of the signal;
calculating current position data of the mobile computing device based on the signal; and
transmitting the current position data to a server via the communications network.

3. The method of claim 2, wherein the step of receiving buried asset data further comprises:
receiving, from the server via the communications network, a plurality of records, wherein each record includes: a) buried asset data including depth data and electrical signal data for one or more buried assets, wherein the buried asset data corresponds to the current position data, and b) a stored image of a physical area corresponding to the current position data, wherein the stored image comprises one or more markings indicating a position of the one or more buried assets;
reading a selection of one of the plurality of records from a user; and
transmitting the selection to the server via the communications network.

4. The method of claim 2, further comprising a step before the step of receiving buried asset data of:
receiving, from the server via the communications network, a plurality of images of a physical area corresponding to the current position data;
reading a selection of one of the plurality of images from a user; and
transmitting the selection to the server via the communications network.

5. The method of claim 4, wherein the step of determining that the stored image is aligned within a margin of error with the current image further comprises:
reading a command from a user indicating that the stored image is aligned within a margin of error with the current image.

6. The method of claim 4, wherein the step of determining that the stored image is aligned within a margin of error with the current image further comprises:
executing an image processing routine for determining that the stored image is aligned within a margin of error with the current image.

7. The method of claim 2, further comprising a step before the step of generating a data structure of:
comparing the buried asset data received from the server with the current buried asset data;
if the buried asset data received from the server is substantially equal to the current buried asset data, executing the steps of generating a data structure and auto-populating the data structure with the current buried asset data, and transmitting the data structure and the second current image to the server via the communications network.

8. A method for facilitating collection and recall of buried asset data on a mobile computing device communicatively coupled with a communications network, comprising:
transmitting current position data of the mobile computing device to a server via the communications network;
receiving, from the server via the communications network, a) buried asset data including depth data and electrical signal data for one or more buried assets, wherein the buried asset data corresponds to the current position data, and b) a stored image of a physical area corresponding to the current position data, wherein the stored image comprises one or more markings indicating a position of the one or more buried assets; displaying the buried asset data from the server;
reading a current image of the physical area from an optical sensor of the mobile computing device;
displaying the stored image simultaneously with the current image, wherein the stored image is overlaid onto the current image;
determining that the stored image is aligned within a margin of error to the current image;
receiving current buried asset data from one or more sensors communicatively coupled with the mobile computing device;
generating a data structure and auto-populating the data structure with the current buried asset data; and
transmitting the data structure and current image to the server via the communications network.

9. The method of claim 8, wherein the step of transmitting current position data further comprises:
receiving a radio frequency signal comprising a time the signal was transmitted and a location of a sender of the signal;
calculating current position data of the mobile computing device based on the signal; and
transmitting the current position data to a server via the communications network.

10. The method of claim 9, wherein the step of receiving buried asset data further comprises:
receiving, from the server via the communications network, a plurality of records, wherein each record includes: a) buried asset data including depth data and electrical signal data for one or more buried assets, wherein the buried asset data corresponds to the current position data, and b) a stored image of a physical area corresponding to the current position data, wherein the stored image comprises one or more markings indicating a position of the one or more buried assets;
reading a selection of one of the plurality of records from a user; and
transmitting the selection to the server via the communications network.

11. The method of claim 9, further comprising a step before the step of receiving buried asset data of:
receiving, from the server via the communications network, a plurality of images of a physical area corresponding to the current position data;
reading a selection of one of the plurality of images from a user; and
transmitting the selection to the server via the communications network.

12. The method of claim 11, wherein the step of determining that the stored image is aligned within a margin of error with the current image further comprises:

reading a command from a user indicating that the stored image is aligned within a margin of error with the current image.

13. The method of claim 11, wherein the step of determining that the stored image is aligned within a margin of error with the current image further comprises:
executing an image processing routine for determining that the stored image is aligned within a margin of error with the current image.

14. The method of claim 8, further comprising a step before the step of generating a data structure of:
comparing the buried asset data received from the server with the current buried asset data;
if the buried asset data received from the server is substantially equal to the current buried asset data, executing the steps of generating a data structure and auto-populating the data structure with the current buried asset data, and transmitting the data structure and the second current image to the server via the communications network.

15. A method for facilitating collection and recall of buried asset data on a mobile computing device, comprising:
determining current position data of the mobile computing device;
accessing a) buried asset data including depth data and electrical signal data for one or more buried assets, wherein the buried asset data corresponds to the current position data, and b) a stored image of a physical area corresponding to the current position data, wherein the stored image comprises one or more markings indicating a position of the one or more buried assets;
displaying the buried asset data;
reading a current image of the physical area from an optical sensor of the mobile computing device;
displaying the stored image simultaneously with the current image, wherein the stored image is overlaid onto the current image; and
determining that the stored image is aligned within a margin of error to the current image;
responsive to determining that the stored image is aligned within a margin of error with the current image, receiving current buried asset data from one or more sensors communicatively coupled with the mobile computing device;
reading a second current image of the physical area from the optical sensor of the mobile computing device, wherein the second current image comprises one or more markings indicating a position of the one or more buried assets;
generating a data structure and auto-populating the data structure with the current buried asset data; and
storing the data structure and the second current image.

16. The method of claim 15, wherein the step of determining current position data further comprises:
receiving a radio frequency signal comprising a time the signal was transmitted and a location of a sender of the signal;
calculating current position data of the mobile computing device based on the signal.

17. The method of claim 16, wherein the step of accessing buried asset data further comprises:
accessing a plurality of records, wherein each record includes: a) buried asset data including depth data and electrical signal data for one or more buried assets, wherein the buried asset data corresponds to the current position data, and b) a stored image of a physical area corresponding to the current position data, wherein the stored image comprises one or more markings indicating a position of the one or more buried assets;
reading a selection of one of the plurality of records from a user; and
accessing the record corresponding to the selection from the user.

* * * * *